(12) United States Patent
Sasaki

(10) Patent No.: US 7,324,422 B2
(45) Date of Patent: Jan. 29, 2008

(54) INFORMATION STORAGE METHOD THAT ASSURES COMPATIBILITY OF WRITABLE MEDIUM WITH READ ONLY MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/635,003

(22) Filed: Dec. 7, 2006

(65) Prior Publication Data

US 2007/0076554 A1 Apr. 5, 2007

Related U.S. Application Data

(63) Continuation of application No. 11/067,730, filed on Mar. 1, 2005, now Pat. No. 7,164,640.

(30) Foreign Application Priority Data

Sep. 19, 2003 (JP) ............................. 2003-328755

(51) Int. Cl.
*G11B 5/09* (2006.01)
(52) U.S. Cl. ................ 369/53.44; 369/47.1; 369/275.3
(58) Field of Classification Search ...................... None
See application file for complete search history.

(56) References Cited

U.S. PATENT DOCUMENTS

| | | | |
|---|---|---|---|
| 5,729,525 A | 3/1998 | Ishida et al. | |
| 6,370,091 B1 | 4/2002 | Kuroda | |
| 6,552,970 B2 | 4/2003 | Ono et al. | |
| 6,600,704 B2 | 7/2003 | Richter et al. | |
| 6,606,285 B1 | 8/2003 | Ijtsma et al. | |
| 6,611,483 B1 | 8/2003 | Park et al. | |
| 6,711,106 B2 | 3/2004 | Sasaki | |
| 6,728,174 B1 | 4/2004 | Sako et al. | |
| 6,853,613 B1 | 2/2005 | Sako et al. | |
| 6,918,003 B2 | 7/2005 | Sasaki | |
| 6,977,880 B2 * | 12/2005 | Tomita | ..................... 369/59.16 |
| 6,986,150 B2 | 1/2006 | Spruit et al. | |
| 2002/0114245 A1 | 8/2002 | Sasaki | |
| 2002/0159353 A1 | 10/2002 | Sasaki | |
| 2003/0033475 A1 | 2/2003 | Sasaki | |
| 2003/0048731 A1 | 3/2003 | Ozaki | |
| 2003/0048733 A1 | 3/2003 | Heemskerk et al. | |

(Continued)

FOREIGN PATENT DOCUMENTS

JP 2003-173626 6/2003

(Continued)

*Primary Examiner*—Muhammad Edun
(74) *Attorney, Agent, or Firm*—Dickstein Shapiro LLP

(57) ABSTRACT

An information recording method performing recording on an information recording medium having multiple rewritable recording layers each having a data area in which user data is to be recorded is disclosed. The method includes a recorded area presence or absence determination step that determines whether a recorded area exists in at least the data area of a first recording layer; and a corresponding unrecorded area data filling step that, if the recorded area exists in the first recording layer, records predetermined data in an unrecorded area in an area, corresponding to the same radial position as the recorded area, in a second recording layer except the first recording layer at a predetermined timing before completion of the recording on the information recording medium.

4 Claims, 24 Drawing Sheets

U.S. PATENT DOCUMENTS

| | | |
|---|---|---|
| 2003/0058763 A1 | 3/2003 | Noda |
| 2003/0133369 A1 | 7/2003 | Sasaki |
| 2003/0223338 A1 | 12/2003 | Sasaki |
| 2004/0057366 A1 | 3/2004 | Sasaki |
| 2004/0090886 A1 | 5/2004 | Sasaki |
| 2004/0133739 A1 | 7/2004 | Sasaki |
| 2004/0156294 A1* | 8/2004 | Watanabe et al. ............. 369/94 |
| 2004/0160875 A1 | 8/2004 | Sasaki |
| 2004/0165499 A1 | 8/2004 | Sasaki |
| 2004/0213117 A1 | 10/2004 | Sasaki |
| 2005/0030852 A1 | 2/2005 | Sasaki |
| 2005/0030873 A1 | 2/2005 | Sasaki |
| 2005/0030874 A1 | 2/2005 | Sasaki |
| 2005/0036422 A1 | 2/2005 | Sasaki |
| 2006/0067194 A1 | 3/2006 | Weijenbergh et al. |

FOREIGN PATENT DOCUMENTS

| | | |
|---|---|---|
| JP | 2004-288308 | 10/2004 |
| JP | 2005-093032 | 4/2005 |
| WO | WO 2004/086373 | 3/2004 |

* cited by examiner

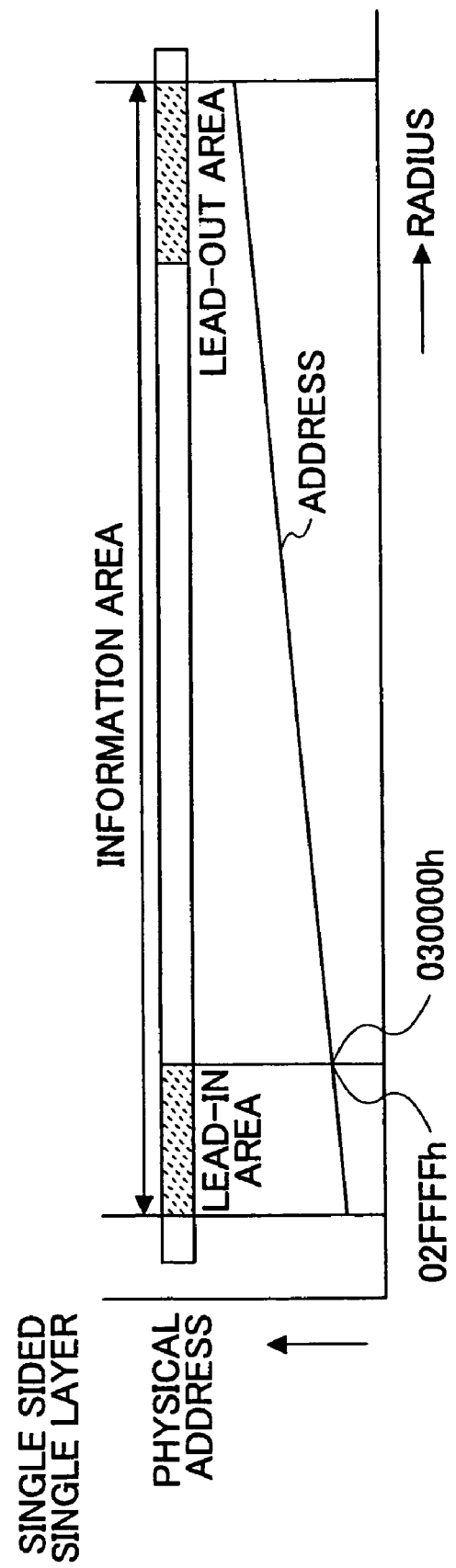

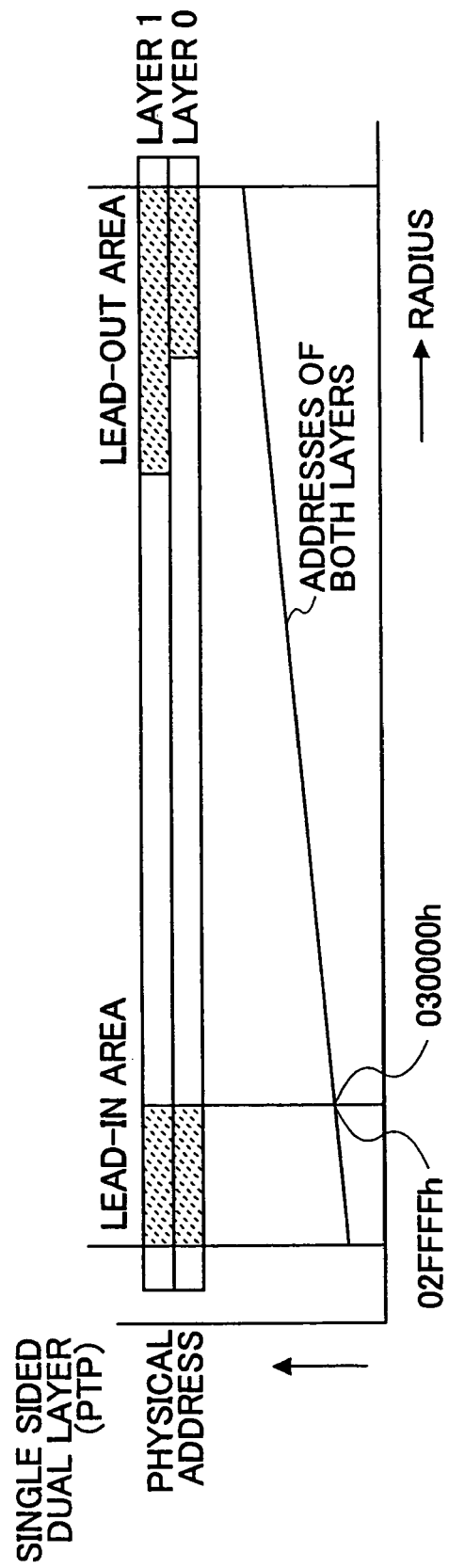

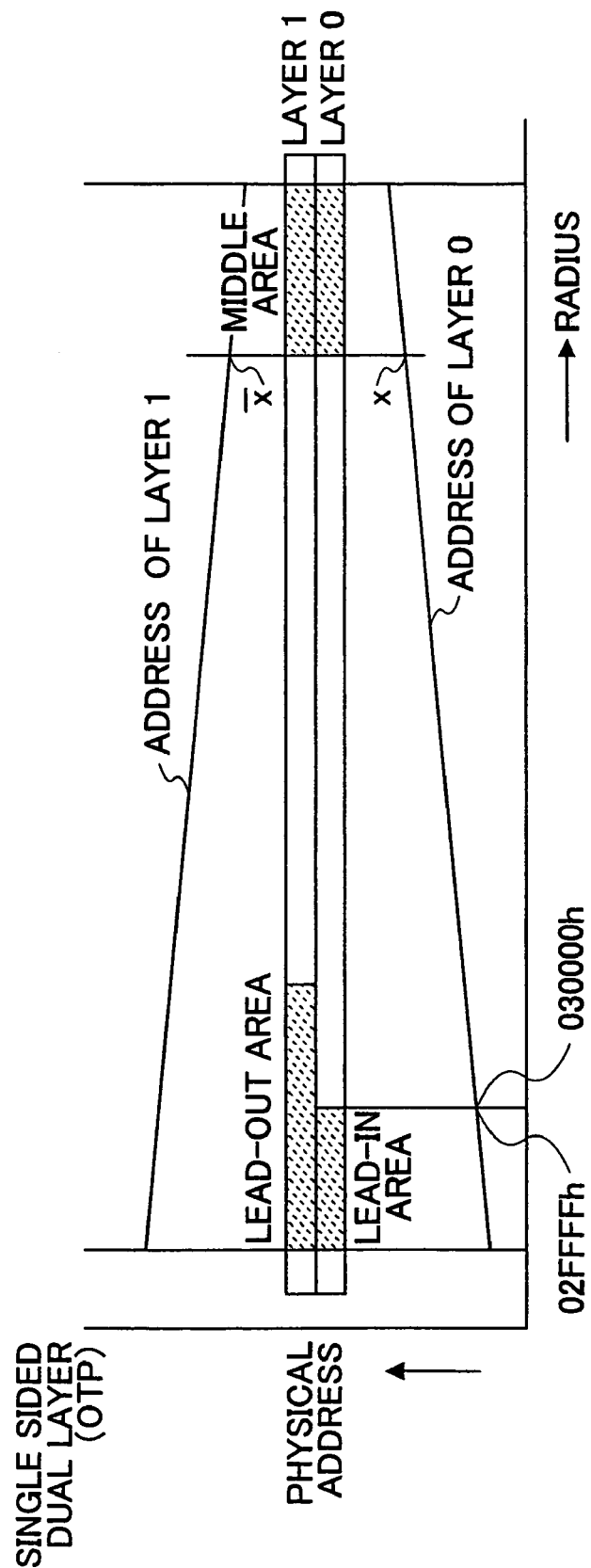

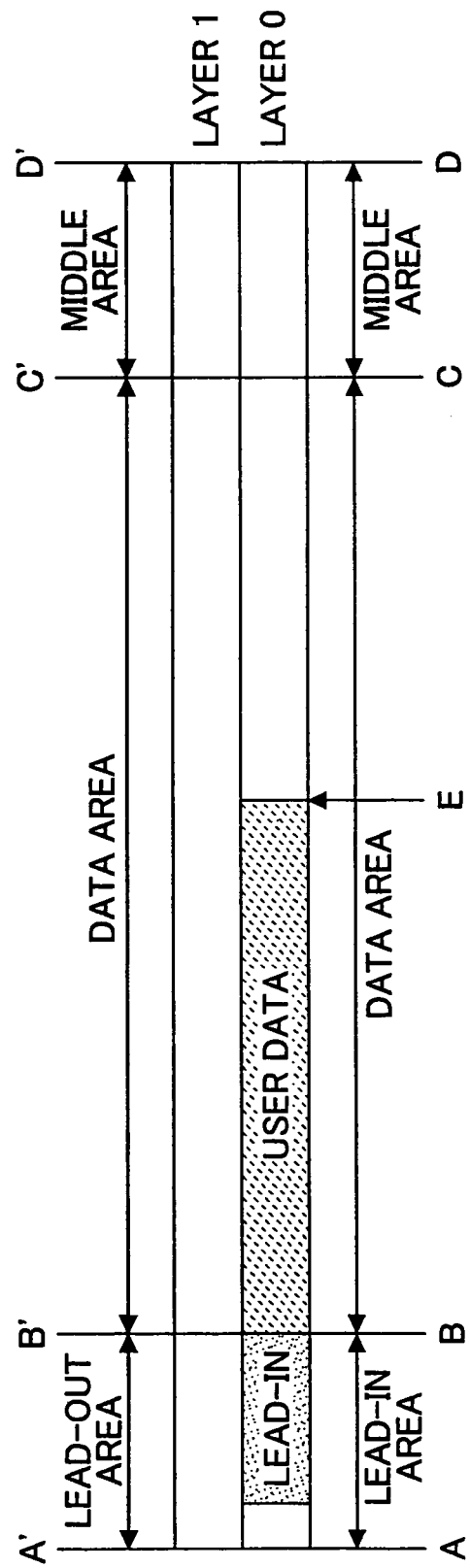

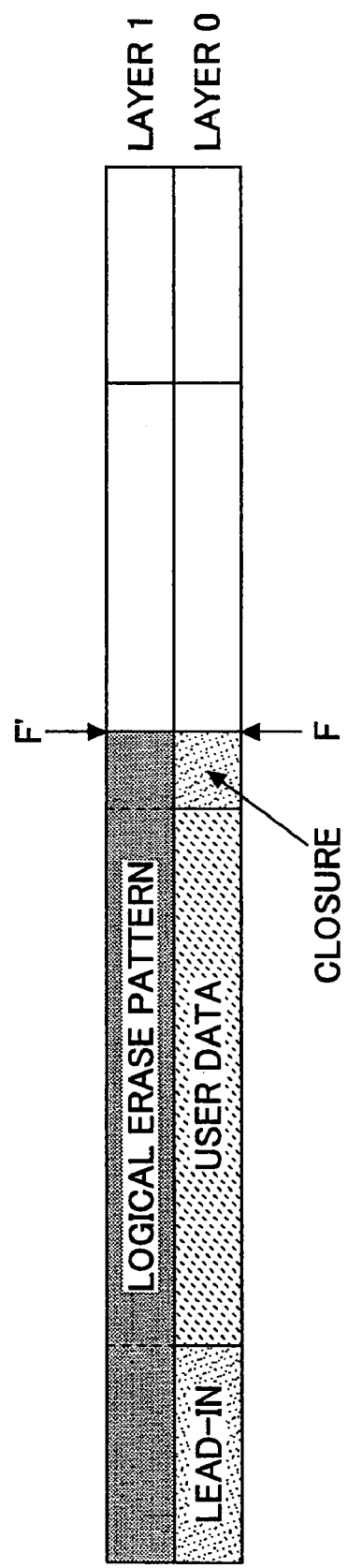

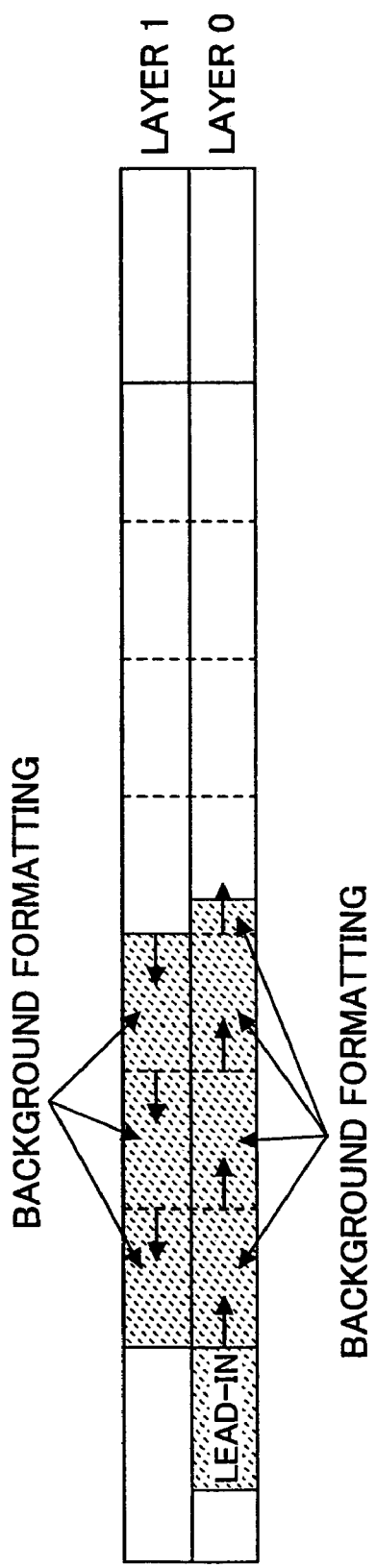

INFORMATION STORAGE METHOD THAT ASSURES COMPATIBILITY OF WRITABLE MEDIUM WITH READ ONLY MEDIUM

This application is a continuation application of application Ser. No. 11/067,730, filed Mar. 1, 2005, now U.S. Pat. No. 7,164,640 which is hereby incorporated herein by reference in its entirety.

BACKGROUND OF THE INVENTION

1. Field of the Invention

The present invention relates to an information recording method, an information recording apparatus, a program for information recording, and a storage medium for recording information on rewritable multilayer information recording media such as dual-layer DVD+RWs (Digital Versatile Disc+ Rewritable).

2. Description of the Related Art

Recordable DVDs include DVD+Rs, which are write-once DVDs, and DVD+RWs, which are rewritable DVDs. These disks are recordable DVDs having high playback compatibility with single sided single layer read-only DVDs. Vigorous research and development efforts are being made for increasing the speed and capacity of these recordable disks.

One of them is a single sided dual layer read-only DVD (hereinafter simply referred to as "dual-layer DVD"). There are two types of recording methods for the dual-layer DVD: Parallel Track Path (PTP) where the track of the second layer runs from the inside to the periphery as that of the first layer and Opposite Track Path (OTP) where the track of the second layer runs from the periphery to the inside. According to PTP, the radial positions of the starting addresses of the data areas of the first layer and the second layer are equal, and both start at a physical address 30000H. Further, a Lead-out area is disposed after the data areas. According to OTP, the radial position of the starting address of the data area of the second layer is equal to the radial position of the end address of the data area of the first layer, and the physical address of the starting position of the data area of the second layer is the bit-flipped address of the end address of the data area of the first layer. If there is a difference in size between the data areas of the first layer and the second layer, the difference area becomes a Lead-out area. For instance, if the end address D1 of the data area of the first layer and the end address D2 of the data area of the second layer satisfy D1>D2 in a PTP disk, the difference area D1-D2 becomes a Lead-out area. Thus, data is also recorded in an area of the second layer corresponding to an area in which data is recorded in the other recording layer. This is to avoid, for instance, the occurrence of a problem in that if no data is recorded at the same radial position in the second layer when a read laser happens to be focused on the second layer in a seek to a target address at the time of a user reproducing the data of the first layer, the data of the first layer cannot be reproduced as a result of the problem of the inability to obtain address information.

Meanwhile, vigorous research and development efforts are also being made for increasing the speed and capacity of recordable information recording media, of which one is a single sided dual layer DVD+R (hereinafter simply referred to as "dual-layer DVD+R") having playback compatibility with the dual-layer DVD. The dual-layer DVD+R has a recording capacity of 8.4 Gbytes, which is approximately twice that of the conventional single-layer DVD+R having a data capacity of 4.7 Gbytes. Recorded data can be read out with DVD players or DVD-ROM drives capable of playing back the dual-layer DVD.

In the dual-layer DVD+R, logical addresses are assigned successively from the starting address of the data area of the first layer, and the logical addresses are successive from the end address of the data area of the first layer to the starting address of the data area of the second layer. That is, when a user records data successively, the recording is started from the starting address of the data area of the first layer, and when the recording is completed up to the end address of the data area of the first layer, the recording goes on to be performed from the starting address of the data area of the second layer. Thus, in dual-layer DVD+R recording, a user can perform recording with the recording layers being transparent thereto. Accordingly, a user may end data recording in the middle of the data area of the second layer or without recording any data in the second layer. For instance, if a user completes data recording in the middle of the data area of the second layer, that is, with an unrecorded area being present in the data area of the second layer, this results in a disk layout incompatible with the read-only dual-layer DVD with the unrecorded area remaining in the data area of the second layer. For instance, if a read laser happens to be focused on the second layer in a seek to a target address when a user reproduces the data of the first layer, there occurs a problem in that the data of the first layer cannot be reproduced as a result of the problem of inability to obtain address information if no data is recorded at the same radial position in the second layer. The same problem results if a user ends data recording without recording any data in the second layer.

In this regard, with respect to the dual-layer DVD+R, it has been proposed (unpublished) to ensure reading in read-only drives by establishing logical compatibility with the dual-layer DVD by recording, for instance, dummy data having a user data attribute or Lead-out in the unrecorded area of the second layer. However, according to this proposal, the compatibility with the dual-layer DVD can be established if recording is completed, but the compatibility with the dual-layer DVD cannot be established in a state halfway through recording.

Further, for instance, with respect to the dual-layer DVD+R, it has been proposed (unpublished) to perform recording by dividing a data area into multiple sessions. In the case of performing recording in one session in the data area of the first layer in an apparatus according to this proposal, it is possible to ensure the conventional single-layer DVD+R playback compatibility in read-only drives by recording data session by session, while it is impossible to ensure the dual-layer DVD+R playback compatibility in read-only drives. This is because no data is recorded in the data area of the second layer at the same radial position as the recorded area of the first layer.

These problems result from the fact that the dual-layer DVD+R is an unrewritable write-once disk. That is, if dummy data or the like is recorded in the unrecorded data of the second layer while recording is not completed, data overwriting occurs in subsequent recording, so that there occurs a problem in that the recorded data cannot be read out.

SUMMARY OF THE INVENTION

It is an object of the present invention to make it possible to ensure compatibility with read-only disks also in a state where recording is not completed, that is, in a state halfway through recording, in a recording operation with respect to an information recording medium having multiple recording layers.

The invention recited in claim 1 is an information recording method performing recording on an information recording medium having a plurality of rewritable recording layers each having a data area in which user data is to be recorded, and includes a recorded area presence or absence determination step that determines whether a recorded area exists in at least the data area of a first recording layer; and a corresponding unrecorded area data filling step that, if the recorded area exists in the first recording layer, records predetermined data in an unrecorded area in an area, corresponding to a same radial position as the recorded area, in a second recording layer except the first recording layer at a predetermined timing before completion of the recording on the information recording medium.

Accordingly, basically, it is possible to rewrite data, and with respect to an information recording medium such as a dual-layer DVD+RW having multiple layers, by performing recording in the unrecorded area of the second layer corresponding to the recorded area of the first layer at a predetermined timing, it is possible to ensure playback compatibility in read-only drives even when the recording on the medium is not completed. For instance, when data is recorded in the first layer in a rewritable dual-layer DVD+RW, by recording predetermined data in the data area of the second layer corresponding to the same radial position as the recorded area of the first layer at a predetermined timing, it is possible to ensure logical compatibility with the dual-layer DVD and to ensure that reading can be performed normally in read-only DVD drives even in a state halfway through recording.

The invention recited in claim 2 is that in the information recording method as recited in claim 1, the predetermined data recorded in the unrecorded area by the corresponding unrecorded area data filling step is dummy data having a user data characteristic.

Accordingly, by using dummy data having a user data attribute as predetermined data to fill in a predetermined unrecorded area, it is possible to provide flexibility as predetermined data without being limited by Lead-out or the like and also to use Lead-out itself for its original purpose of defining the end address of the recording layer, thus making it possible to approximate the state including the dummy data to normal user data recording.

The invention recited in claim 3 is that in the information recording method as recited in claim 1, the predetermined data recorded in the unrecorded area by the corresponding unrecorded area data filling step is Lead-out.

Accordingly, it can be realized easily by extended use of Lead-out, which is primarily to be recorded after the data area, as predetermined data to fill in a predetermined unrecorded area.

The invention recited in claim 4 is that in the information recording method as recited in claim 1, the predetermined data recorded in the unrecorded area by the corresponding unrecorded area data filling step is a Logical Erase pattern indicating being logically unrecorded.

In the case of performing erasure in a recording area in rewritable CD-RWs, the recording area is not returned to a physically unrecorded state, but a Logical Erase pattern indicating being logically erased is recorded in the recording area. An area in which a Logical Erase pattern is recorded is an unrecorded area to an information recording apparatus that can identify the pattern, but is a recorded area to the conventional drive unit that cannot identify the pattern.

Therefore, recording a Logical Erase pattern in the unrecorded area of the second layer makes it possible to ensure playback compatibility in read-only drives, and makes it possible for the information recording apparatus that can identify the pattern to retain on the medium the state where the second layer is unrecorded.

The invention recited in claim 5 is that in the information recording method as recited in any of claims 1 to 4, the predetermined timing at which the recording is performed in the unrecorded area by the corresponding unrecorded area data filling step is when a request to eject the information recording medium is received from a user.

Accordingly, since recording of predetermined data to fill in an unrecorded area is for ensuring playback compatibility in read-only drives, the predetermined data may be recorded when the medium is ejected after data recording in an information recording apparatus.

The invention recited in claim 6 is that in the information recording method as recited in any of claims 1 to 4, the predetermined timing at which the recording is performed in the unrecorded area by the corresponding unrecorded area data filling step is a time immediately after data recording in the recorded area of the first recording layer.

Accordingly, not only when a medium ejection request is received, but also when data recording from a user is performed, subsequent to the requested data recording, predetermined data may be recorded in au unrecorded area in the other recording layer which is at the same radial position as the recorded area. In this case, performance for individual recording requests is lowered. However, compared with the case of, for instance, claim 5, time required for medium ejection processing can be reduced.

The invention recited in claim 7 is that in the information recording method as recited in any of claims 1 to 4, the recording is performed on the information recording medium by multisession recording and the predetermined timing at which the recording is performed in the unrecorded area by the corresponding unrecorded area data filling step is when a request to close a session is received from a user.

The purpose of recording Lead-in and Lead-out before and after recorded data by closing a session in an information recording medium on which multisession recording is performed is to ensure playback compatibility in read-only drives. That is, a session is closed only when compatibility with read-only drives is required, and a session is not closed and data is additionally recorded in the same session if no compatibility is required with read-only drives. Accordingly, also in the case of an information recording medium having multiple recording layers, predetermined data may be recorded at the time of session closing. Thus, when recording is performed on an information recording medium by multisession recording, by recording predetermined data at the time of session closing, it is possible to ensure playback compatibility only when playback compatibility with read-only drives is required. Further, in the case where no playback compatibility is required, it is possible to prevent a decrease in performance due to predetermined data recording.

The invention recited in claim 8 is that in the information recording method as recited in any of claims 1 to 4, the predetermined timing at which the recording is performed in the unrecorded area by the corresponding unrecorded area data filling step is when no medium access request is received from a user.

For instance, in the DVD+RW, which is a rewritable DVD, background formatting, which performs formatting to be performed prior to data recording from a user in the background, is employed. In background formatting, in response to a formatting request from a user, the user is notified of completion of formatting after recording is performed in only part of the Lead-in area (initial processing) and dummy data is recorded in the remaining area when there is no access from the user. Accordingly, predetermined data recording may be performed in the background when there is no medium access from the user. Thus, by performing predetermined data recording in the background when there is no medium access from a user, it is possible to reduce time necessary for medium ejection and session closing compared with claims 5 and 7 described above. Further, since predetermined data recording is not performed during recording from a user, it is possible to prevent recording performance from being lowered compared with claim 6.

The invention recited in claim 9 is that the information recording method as recited in claim 8 includes a recording operation interruption step that interrupts an operation of recording the predetermined data when the medium access request is received from the user during the recording of the predetermined data in the unrecorded area.

Accordingly, it is possible to perform recording of predetermined data in an unrecorded area without causing a problem for the primary accessing operation.

The invention recited in claim 10 is that the information recording method as recited in claim 1 includes a background formatting step that performs formatting of the information recording medium in a background, wherein the predetermined timing at which the recording is performed in the unrecorded area by the corresponding unrecorded area data filling step is when a request to interrupt the background formatting is received from a user during the background formatting of the information recording medium.

For instance, in the DVD+RW background formatting, it is possible to extract a medium even during formatting. With respect to the DVD+RW, background formatting is interrupted temporarily at the time of extracting the medium. In this interruption, in the case of establishing compatibility with the conventional read-only DVD drive, dummy data is recorded in the unrecorded area between recorded areas intermittently recorded on the medium so as to create a successively recorded state, and thereafter, temporary Lead-out is recorded from the final address of the recording area. In this, it is considered, also with respect to an information recording apparatus performing background formatting on an information recording medium having multiple recording layers, to extract the medium during its formatting. At this point, in order to ensure playback compatibility with read-only drives, it is necessary to perform, in addition to formatting interruption as described with reference to the case of the DVD+RW as an example, recording of predetermined data in an unrecorded area in the other recording layer. Accordingly, according to the present invention, also in the case of performing background formatting on the information recording medium having multiple recording layers, it is possible to extract the disk while ensuring playback compatibility in read-only drives during its formatting.

The invention recited in claim 11 is that the information recording method as recited in claim 1 includes a background formatting step that performs formatting of the information recording medium in a background by dividing each of the data areas of the recording layers into a plurality of areas, and performs recording alternately in the recording layers with respect to the divided areas.

Normally, in background formatting, dummy data is successively recorded from the inside of a medium. Accordingly, also in the invention recited in claim 10 where background formatting is performed on an information recording medium having multiple recording layers, it is expected that dummy data is recorded from the first recording layer assigned a minimum logical address, and that dummy data is recorded in the next recording layer when formatting of the first recording layer is completed. However, considering extraction of a medium while ensuring compatibility in read-only drives during formatting, this recording order in background formatting causes a problem in that time is required in interrupting background formatting. This is because no consideration is given to the necessity of recording predetermined data in formatting interruption. For instance, in the case of interrupting formatting with dummy data recording by formatting being completed with respect to substantially the entire data area of the above-described first recording layer, it is necessary to record the predetermined data in substantially the entire data area of the other recording layer in order to ensure compatibility in read-only drives. In this respect, in dummy data recording in background formatting, by performing recording alternately in the data areas of the multiple recording layers divided area by divided area as in the present invention, it is possible, at the time of receiving a format interruption request, to reduce areas in which predetermined data is to be recorded and end formatting interruption in a short period of time.

The invention recited in claim 12 is that in the information recording method as claimed in any of claims 1 to 11, the information recording medium is an information recording medium based on a DVD+RW standard.

Accordingly, it is suitably applicable in the case where an object is an information recording medium based on the DVD+RW standard in which the existence of an unrecorded area causes a problem in compatibility with read-only information recording media having multiple recording layers.

The operations and effects by the information recording method recited in claims 1 through 12 may also be produced by the information recording apparatus recited in claims 13 through 24, the program for information recording recited in claim 25, and the storage medium recited in claim 26 in the same manner.

According to the present invention, it is possible to rewrite data, and with respect to an information recording medium such as a dual-layer DVD+RW having multiple layers, recording is performed in the unrecorded area of the second layer corresponding to the recorded area of the first layer at a predetermined timing. Accordingly, it is possible to ensure playback compatibility in read-only drives even when the recording on the medium is not completed, that is, in a state halfway through recording.

BRIEF DESCRIPTION OF THE DRAWINGS

FIGS. 2A through 2C are explanatory diagrams showing read-only DVD layouts;

FIGS. 3A and 3B are explanatory diagrams exemplarily showing an embodiment of a data example of an information recording method for a dual-layer DVD+RW according to OTP;

FIGS. 5A and 5B are explanatory diagrams exemplarily showing another embodiment of the data example of the information recording method for the dual-layer DVD+RW according to OTP;

FIGS. 11A through 11D are explanatory diagrams for illustrating processing control in each divided area, showing the case of successive processing in contrast.

DETAILED DESCRIPTION OF THE PREFERRED EMBODIMENTS

Figure 1:
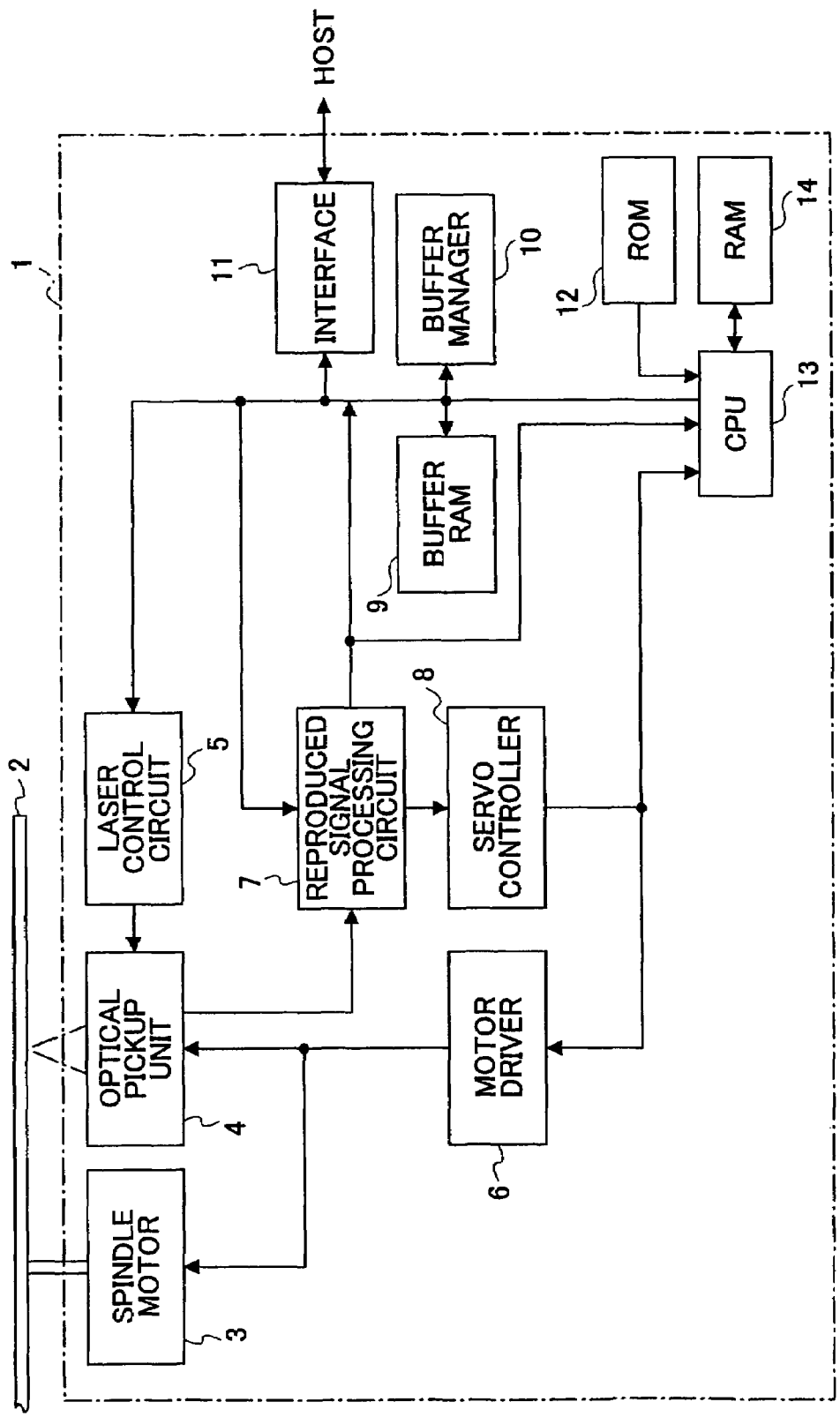
FIG. 1 is a block diagram showing a schematic configuration of an optical disk unit according to an embodiment of the present invention.

A description is given, with reference to the drawings, of best embodiments of the present invention. FIG. 1 is a block diagram showing a schematic configuration of an optical disk unit 1 as an information recording apparatus according to this embodiment.

The optical disk unit 1 is configured by including a spindle motor 3 for rotating an optical disk 2 as an information recording medium, an optical pickup unit 4, a laser control circuit 5, a motor driver 6, a reproduced signal processing circuit 7, a servo controller 8, a buffer RAM 9, a buffer manager 10, an interface 11, a ROM 12, a CPU 13, and a RAM 14. The arrows shown in FIG. 1 indicate typical signal and information flows, but do not represent all the connections of the blocks.

To be more detailed, first, it is an application to a case where a single sided dual layer DVD+RW (hereinafter simply referred to as "dual-layer DVD+RW") based on the DVD+RW standard is an object of recording as the optical disk 2.

The optical pickup unit 4 is configured by including a semiconductor laser as a light source; an optical system including an objective lens, the optical system guiding laser light emitted from the semiconductor laser onto the recording surface of the optical disk 2 and guiding returning light reflected from the recording surface to a predetermined light-receiving position; a light receiver disposed at the light-receiving position to receive the returning light; and a drive system (a focusing actuator, a tracking actuator, a seek motor, etc.) (none graphically illustrated). The light receiver outputs current (a current signal) according to the amount of received light to the reproduced signal processing circuit 7.

The servo controller 8 generates a control signal to control the focusing actuator of the optical pickup unit 4 based on a focus error signal, and generates a control signal to control the tracking actuator of the optical pickup unit 4 based on a track error signal. These control signals are output from the servo controller 8 to the motor driver 6.

The motor driver 6 drives the focusing actuator and the tracking actuator of the optical pickup unit 4 based on the control signals from the servo controller 8. The motor driver 6 controls the spindle motor 3 based on an instruction from the CPU 13 so that the linear velocity of the optical disk 2 is constant. Further, the motor driver 6 drives the seek motor for the optical pickup unit 4 based on an instruction from the CPU 13 so as to move the optical pickup unit 4 radially to a target track of the optical disk 2.

The interface 11 is a bidirectional communications interface with a host (for instance, a PC) serving as an external apparatus.

The CPU 13, together with the ROM 12 and the RAM 14, composes the microcomputer (computer) of the optical disk unit 1. The ROM 12, which also functions as a storage medium, stores programs including a below-described program for information recording written in a code decodable by the CPU 13. The CPU 13 controls the operation of each of the above-described parts in accordance with the programs stored in the ROM 12, and temporarily stores data necessary for control in the RAM 14. When the optical disk unit is turned on, the programs stored in the ROM 12 are loaded into (installed in) the main memory (not graphically illustrated) of the CPU 13.

This embodiment is characterized by recording control in the case where the target dual-layer DVD+RW, which is the optical disk 2, is mounted in the optical disk unit 1 and a request to record user data is made from the host side. Prior to its description, a description is given of the layout of a read-only DVD, which is the premise of the DVD+RW standard.

First, read-only DVD layouts are shown in FIGS. 2A through 2C. FIG. 2A shows the case of a single sided single layer disk (hereinafter "single-layer disk"), FIG. 2B shows the case of a single sided dual layer disk according to PTP (hereinafter "PTP disk"), and FIG. 2C shows the case of a single sided dual layer disk according to OTP (hereinafter "OTP disk").

Basically, the DVD disk has an information area formed of a Lead-in area, a data area, and a Lead-out area. The single-layer disk and the PTP disk have the information area in each recording layer. The OPT disk, which is formed of a signal information area, has a middle area after the data area of each recording layer. In the single-layer disk, Layers 0 and 1 of the PTP disk, and Layer 0 of the OTP disk, data is reproduced from the inside to the periphery. In Layer 1 of the OTP disk, data is reproduced from the periphery to the inside. Each of the recording layers of the single-layer disk and the PTP disk are assigned successive physical addresses (physical sector names) from the Lead-in area to the Lead-out area. Meanwhile, in the case of the OTP disk, successive physical addresses are assigned from the Lead-in area to the middle area of Layer 0, and the bit-flipped addresses of the physical addresses of Layer 0 are assigned as the physical addresses of Layer 1, which increase from the middle area to the Lead-out area. That is, the starting address of the data area in Layer 1 is the bit-flipped address of the end address in Layer 0.

As shown in FIG. 2B, in the PTP disk, the starting and end addresses of the Lead-in areas, the starting addresses of the data areas, and the end addresses of the Lead-out areas are at the same respective radial positions, and the starting address of the Lead-out area, that is, the end address of the data area, may be different in each recording layer. If the end addresses of the data areas are different, Lead-out is recorded in the difference area.

Meanwhile, as shown in FIG. 2C, in the case of the OTP disk, the starting address of the Lead-in area and the end address of the Lead-out area, the end address of the data area of Layer 0 and the starting address of the data area of Layer 1, and the starting and end addresses of the middle areas of the recording layers are at the same radial positions, respectively, and the starting address of the data area of Layer 0 and the end address of the data area of Layer 1 do not necessarily match. Lead-out is also recorded in the difference area in the case of the OTP disk.

Figure 3B:
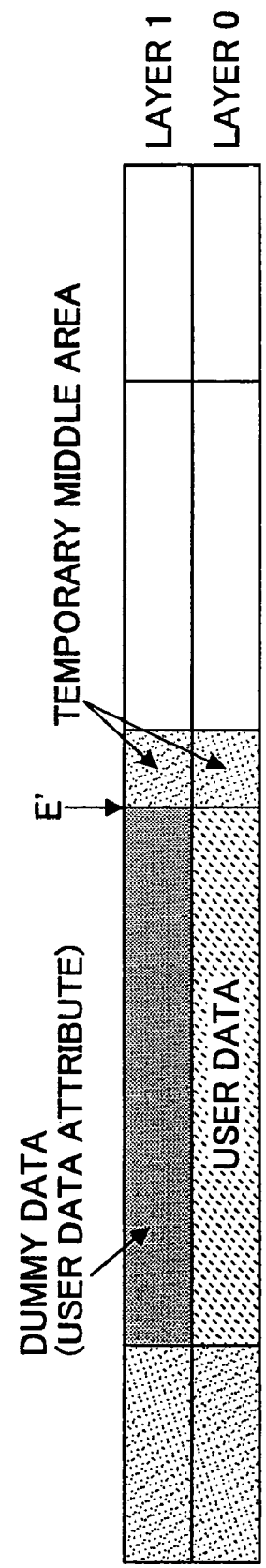

Of an information recording method according to this embodiment for the dual-layer DVD+RW (optical disk 2) based on these read-only DVD layouts, for instance, according to OTP, a description is given, with reference to FIGS. 3A and 3B, of a predetermined data example. According to this embodiment, it is assumed that background formatting is performed on the optical disk 2 and a user records data during the background formatting.

First, FIG. 3A shows a state where data is being recorded during background formatting. In formatting the optical disk 2 according to this embodiment, after performing recording on part of the Lead-in area (Layer 0), a user is notified of completion of formatting. After notification of completion of formatting, recording goes on to be performed on the data area in the background. When the user makes a request for recording, the background formatting is interrupted, and recording is performed in a requested area. Here, it is assumed that as shown in FIG. 3A, the user performs disk ejection with data being recorded from Address B to Address E on the optical disk 2.

FIG. 3B shows dummy data recording in the case of performing disk ejection, interrupting the background formatting. In the case of disk ejection, the user makes a formatting interruption request to the optical disk unit 1. In formatting interruption, first, dummy data is recorded in the unrecorded area between intermittently recorded areas on the optical disk 2 so as to create a successively recorded state. In this embodiment, however, user data is successively recorded. Accordingly, this processing is skipped. Next, dummy data of a user data attribute, for instance, all-0 data, is recorded in the unrecorded area (from Address E' to Address B') of Layer 1, which is at the same radial position as the recorded area (from Address B to Address E) in the data area of Layer 0. Here, B' and E' are the bit-flipped values of B and E, respectively. Further, at this point, a temporary middle area may be recorded after Address E and before (on the periphery side of) Address E', and Lead-out may be recorded in the Lead-out area.

Accordingly, according to this embodiment, basically, it is possible to rewrite data, and by performing recording in the unrecorded area of Layer 1 (second layer) corresponding to the recorded area of Layer 0 (first layer) at a predetermined timing in the optical disk 2 such as a dual-layer DVD+RW having multiple recording layers, it is possible to ensure playback compatibility in read-only drives even when recording on the optical disk 2 is not completed. That is, when data is recorded in Layer 0 in the dual-layer DVD+RW, recording predetermined data in the data area of Layer 1 corresponding to the same radial position as the recorded area of Layer 0 at a predetermined timing makes it possible to ensure logical compatibility with the dual-layer DVD and to ensure that reading can be performed normally in read-only DVD drives even in a state halfway through recording. In this case, using dummy data having a user data attribute as predetermined data to fill in a predetermined unrecorded area makes it possible to provide flexibility as predetermined data without being limited by Lead-out or the like and also to use Lead-out itself for its original purpose of defining the end address of the recording layer, thus making it possible to approximate the state including the dummy data to normal user data recording.

Figure 4A:
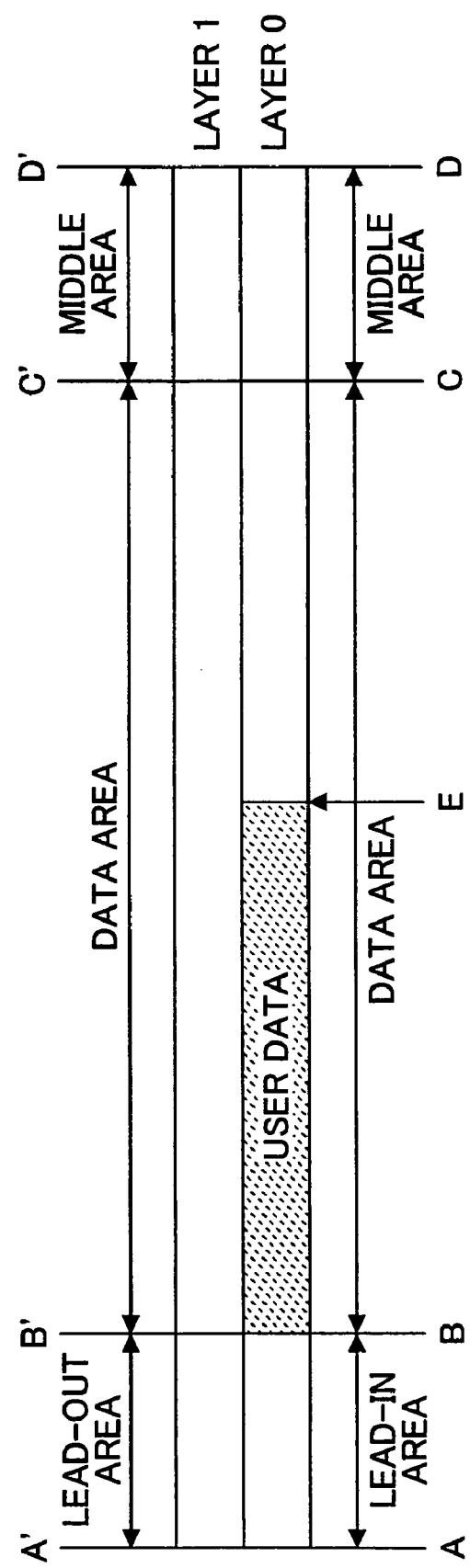
FIGS. 4A and 4B are explanatory diagrams exemplarily showing another embodiment of the data example of the information recording method for the dual-layer DVD+RW according to OTP.
Figure 4B:
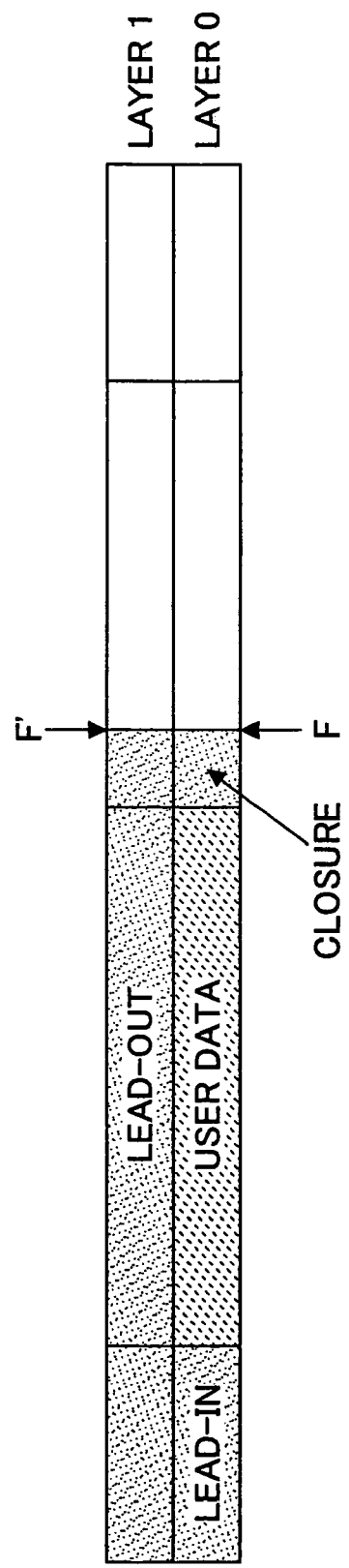

Of the information recording method for the dual-layer DVD+RW (optical disk 2), a description is given, with reference to FIGS. 4A and 4B, of another embodiment of the predetermined data example. In this embodiment, recording is performed on the optical disk 2 according to multisession recording. Here, multisession recording for the DVD+R, which is a write-once DVD, is applied, so that Lead-in (Lead-in of the second or later session is referred to as "Intro" according to DVD+R multisession recording) is recorded before a user data area, and Lead-out (similarly, Lead-out of a session before the final session is referred to as "Closure") is recorded after the user data area.

FIG. 4A shows a state where data is recorded in the first session (from Address B to Address E), and it is assumed that a Session Close request has been received from a user in this state.

FIG. 4B shows Lead-out recording in session closing. In session closing, first, Lead-out is recorded in the unrecorded area (from Address F' to Address B') of Layer 1 which is at the same radial position as the recorded area (from Address B to Address F) in the data area of Layer 0. Next, the Lead-in area is recorded, and Closure (from Address E to Address F) is recorded subsequent to the data area (from Address B to Address E) recorded in Layer 0. Further, Lead-out is recorded from Address F' to Address E' and also in the Lead-out area in Layer 1. Here, B', E', and F' are the bit-flipped values of B, E, and F, respectively. In this embodiment, Lead-out recording in Layer 1 is performed in multiple times, but may be performed successively.

Strictly, logical compatibility with the dual-layer DVD is not established in the state shown in FIG. 4B (where Layer 1 is all Lead-out and no middle area exists). However, at least, it is not a state where data is recorded only in Layer 0. Accordingly, it is possible to read out the data of Layer 0 normally in read-only DVD drives. The optical disk 2 according to this embodiment allows data overwriting. Accordingly, the optical disk 2 may be subjected to recording in a format that establishes logical compatibility with the dual-layer DVD when data recording ends completely.

Accordingly, according to this embodiment, as in the case described in FIGS. 3A and 3B, when data is recorded in Layer 0 in the dual-layer DVD+RW, by recording predetermined data in the data area of Layer 1 corresponding to the same radial position as the recorded area of Layer 0 at a predetermined timing, it is possible to ensure logical compatibility with the dual-layer DVD and to ensure that reading can be performed normally in read-only DVD drives even in a state halfway through recording. In particular, this can be realized easily by extended use of Lead-out, which is primarily to be recorded after the data area, as predetermined data to fill in a predetermined unrecorded area.

Figure 5A:
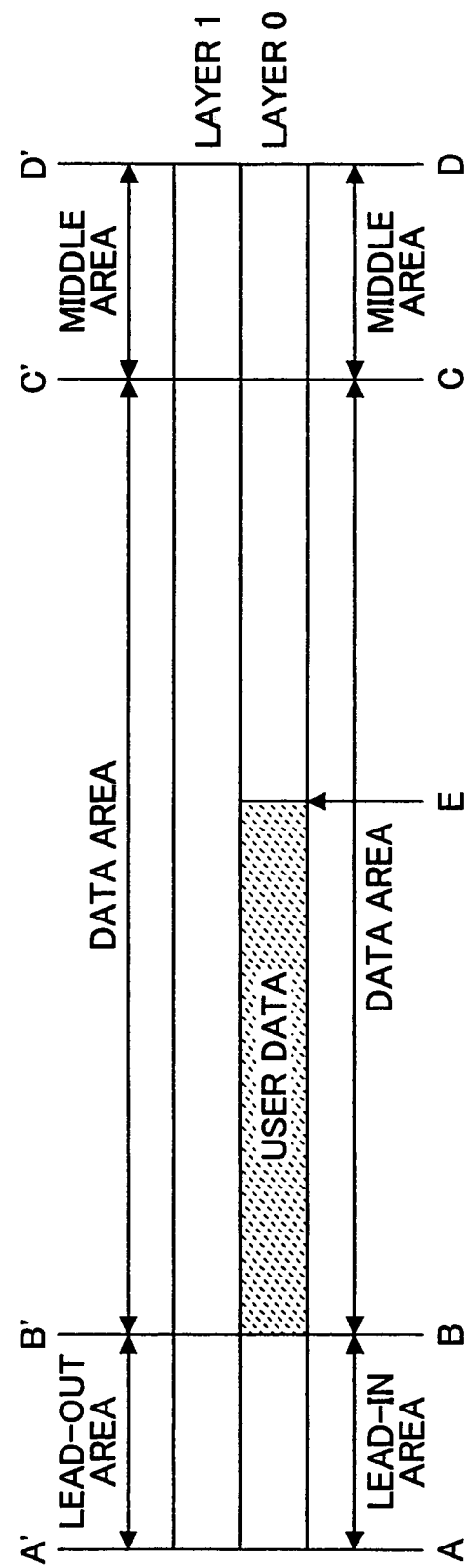

Of the information recording method for the dual-layer DVD+RW (optical disk 2), a description is given, with reference to FIGS. 5A and 5B, of another embodiment of the predetermined data example. In this embodiment, as in the case described in FIGS. 4A and 4B, recording is performed on the optical disk 2 according to multisession recording.

FIG. 5A shows a state where data is recorded in the first session (from Address B to Address E), and it is assumed that a Session Close request has been received from a user in this state.

FIG. 5B shows Logical Erase pattern recording in session closing. In session closing, first, a Logical Erase pattern is recorded in the unrecorded area (from Address E' to Address B') of Layer 1, which is at the same radial position as the recorded area (from Address B to Address E) in the data area of Layer 0. Next, the Lead-in area is recorded, and Closure (from Address E to Address F) is recorded subsequent to the data area (from Address B to Address E) recorded in Layer 0. Further, the Logical Erase pattern is recorded from Address F' to Address E' and also in the Lead-out area as predetermined data in Layer 1. Here, B', E', and F' are the bit-flipped values of B, E, and F, respectively. In this embodiment, Logical Erase pattern recording in Layer 1 is performed in multiple times, but may be performed successively. Further, Lead-out may be recorded instead of the Logical Erase pattern in the Lead-out area.

Strictly, logical compatibility with the dual-layer DVD is not established in the state shown in FIG. 5B (where the Lead-out area and the middle area do not exist). However, at least, it is not a state where data is recorded only in Layer 0. Accordingly, it is possible to read out the data of Layer 0 normally in read-only DVD drives. This information recording medium allows data overwriting. Accordingly, the information recording medium may be subjected to recording in a format that establishes logical compatibility with the dual-layer DVD when data recording ends completely.

In the case of performing erasure in a recording area in rewritable CD-RWs, the recording area is not returned to a physically unrecorded state, but a Logical Erase pattern indicating being logically erased is recorded in the recording area. An area in which a Logical Erase pattern is recorded is an unrecorded area to an optical disk unit that can identify the pattern, but is a recorded area to the conventional drive unit that cannot identify the pattern. Therefore, recording a Logical Erase pattern in the unrecorded area of the second layer as in this embodiment makes it possible to ensure playback compatibility in read-only drives, and makes it possible for the optical disk unit 1 that can identify the pattern to retain on the medium the state where the second layer is unrecorded.

Figure 6:
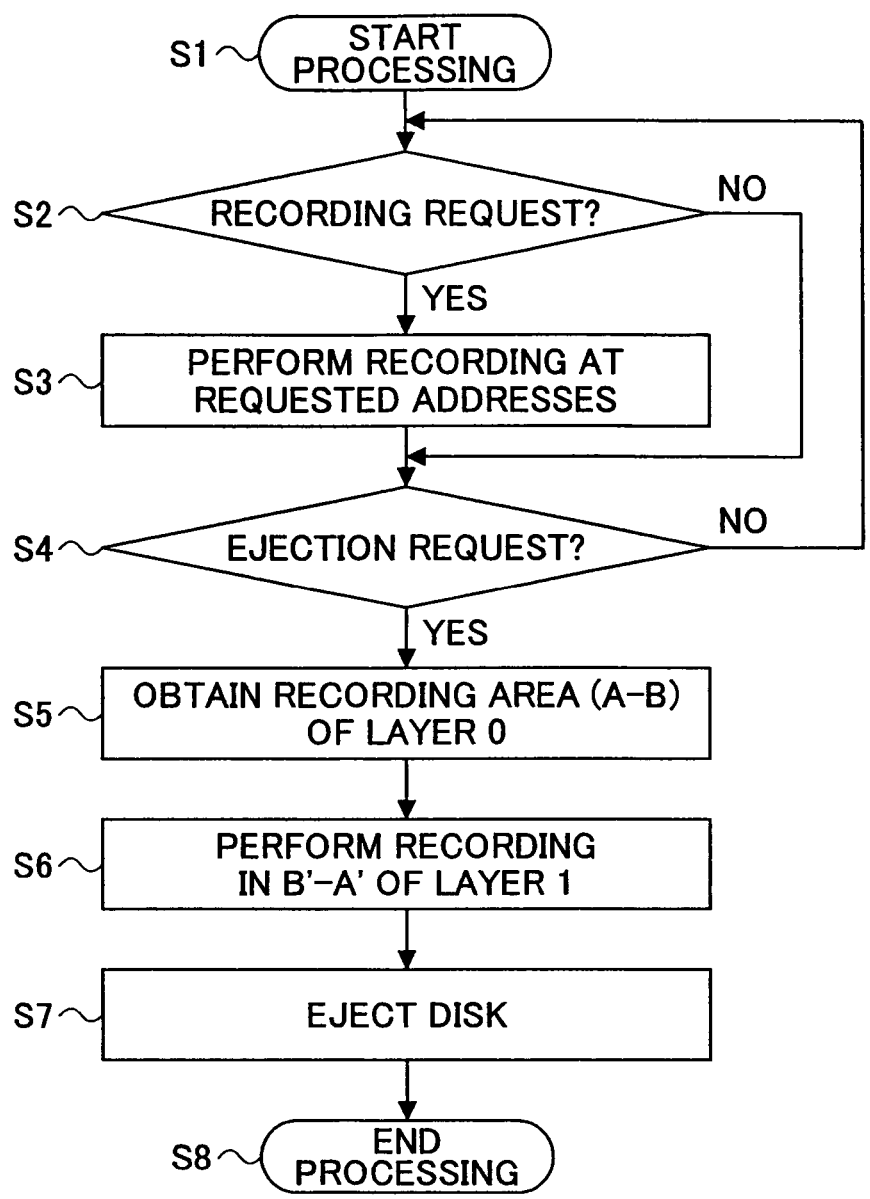
FIG. 6 is a schematic flowchart exemplarily showing an embodiment of timing control of the information recording method for the dual-layer DVD+RW according to OTP.

Of the information recording method for the dual-layer DVD+RW (optical disk 2), a description is given, with reference to FIG. 6, of an embodiment of control of timing for recording predetermined data. According to this embodiment, it is assumed that in order to simplify processing, recording from a user is performed successively from the starting address of the data area of Layer 0 and data is recorded only in Layer 0 when a disk ejection request is made.

First, when processing is started (step S1), it is determined whether a recording request has been received from a user (S2). If a recording request has been received from a user (Y of S2), recording is performed in a requested area (S3). If no recording request has been received from a user (N of S2), the processing of step S3 is skipped. Next, it is determined whether a disk ejection request has been received from the user (S4). If there is no disk ejection request (N of S4), a recording request from the user is awaited again (S2). On the other hand, if a disk ejection request has been received from the user (Y of S4), a recording area in Layer 0 is detected (S5). The processing of step S5 is executed as a recorded area presence or absence determination step, recorded area presence or absence determination means, or a recorded area presence or absence determination function.

At this point, if Address A to Address B of Layer 0 is a recorded area, dummy data of a user data attribute, Lead-out, or a Logical Erase pattern is recorded as predetermined data from Address B' to Address A' of Layer 1 (S6), the optical disk 2 is ejected (S7), and the processing ends (S8). The processing of step S6 is executed as a corresponding unrecorded area data filling step, corresponding unrecorded area data filling means, or a corresponding unrecorded area data filling function.

In this embodiment, no particular consideration is given to recording in the Lead-in area (Layer 0), the Lead-out area (Layer 1), and the middle areas (Layers 0, 1). However, recording may be performed in each area at the time of disk ejection.

Accordingly, since recording of predetermined data to fill in an unrecorded area is for ensuring playback compatibility in read-only drives, it is sufficient that a predetermined timing for performing recording in the unrecorded area by step S6 be the time when a request to eject the optical disk 2 is received from a user (step S5) as in this embodiment.

Figure 7:
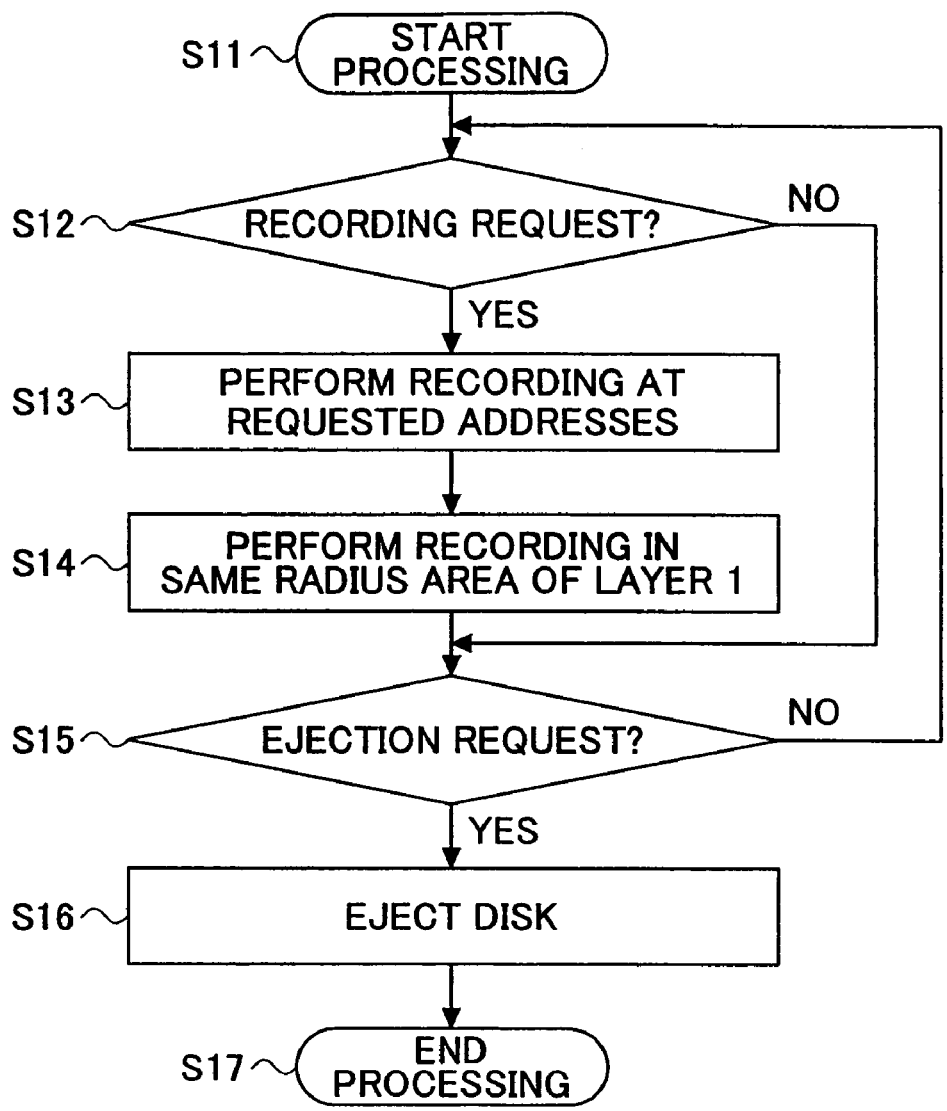
FIG. 7 is a schematic flowchart exemplarily showing another embodiment of the timing control of the information recording method for the dual-layer DVD+RW according to OTP.

Of the information recording method for the dual-layer DVD+RW (optical disk 2), a description is given, with reference to FIG. 7, of another embodiment of control of timing for recording predetermined data. According to this embodiment, as in the case of FIG. 6, it is assumed that in order to simplify processing, recording from a user is performed successively from the starting address of the data area of Layer 0 and data is recorded only in Layer 0 when a disk ejection request is made.

First, when processing is started (step S11), it is determined whether a recording request has been received from a user (S12). If a recording request has been received from a user (Y of S12), recording is performed in a requested area (S13), and thereafter, recording is performed in the area of Layer 1 which is on the same radius as the recorded area (S14). The processing of steps S12 and S13 is executed as a recorded area presence or absence determination step, recorded area presence or absence determination means, or a recorded area presence or absence determination function. The processing of step S14 is executed as a corresponding unrecorded area data filling step, corresponding unrecorded area data filling means, or a corresponding unrecorded area data filling function. If no recording request has been received from a user (N of S12), the processing of steps S13 and S14 is skipped. Next, it is determined whether a disk ejection request has been received from the user (S14). If there is no disk ejection request (N of S14), a recording request from the user is awaited again (S12). On the other hand, if a disk ejection request has been received from the user (Y of S14), the disk is ejected (S17), and the processing ends (S8).

In this embodiment, no particular consideration is given to recording in the Lead-in area (Layer 0), the Lead-out area (Layer 1), and the middle areas (Layers 0, 1). However, recording may be performed in each area at the time of disk ejection.

Thus, according to this embodiment, every time a recording request is received, recording is performed in an unrecorded area in Layer 1 positioned on the same radius as the recorded area. Accordingly, compared with the method of FIG. 6, performance for individual recording requests is lowered, but processing for a disk ejection request can be improved.

Figure 8:
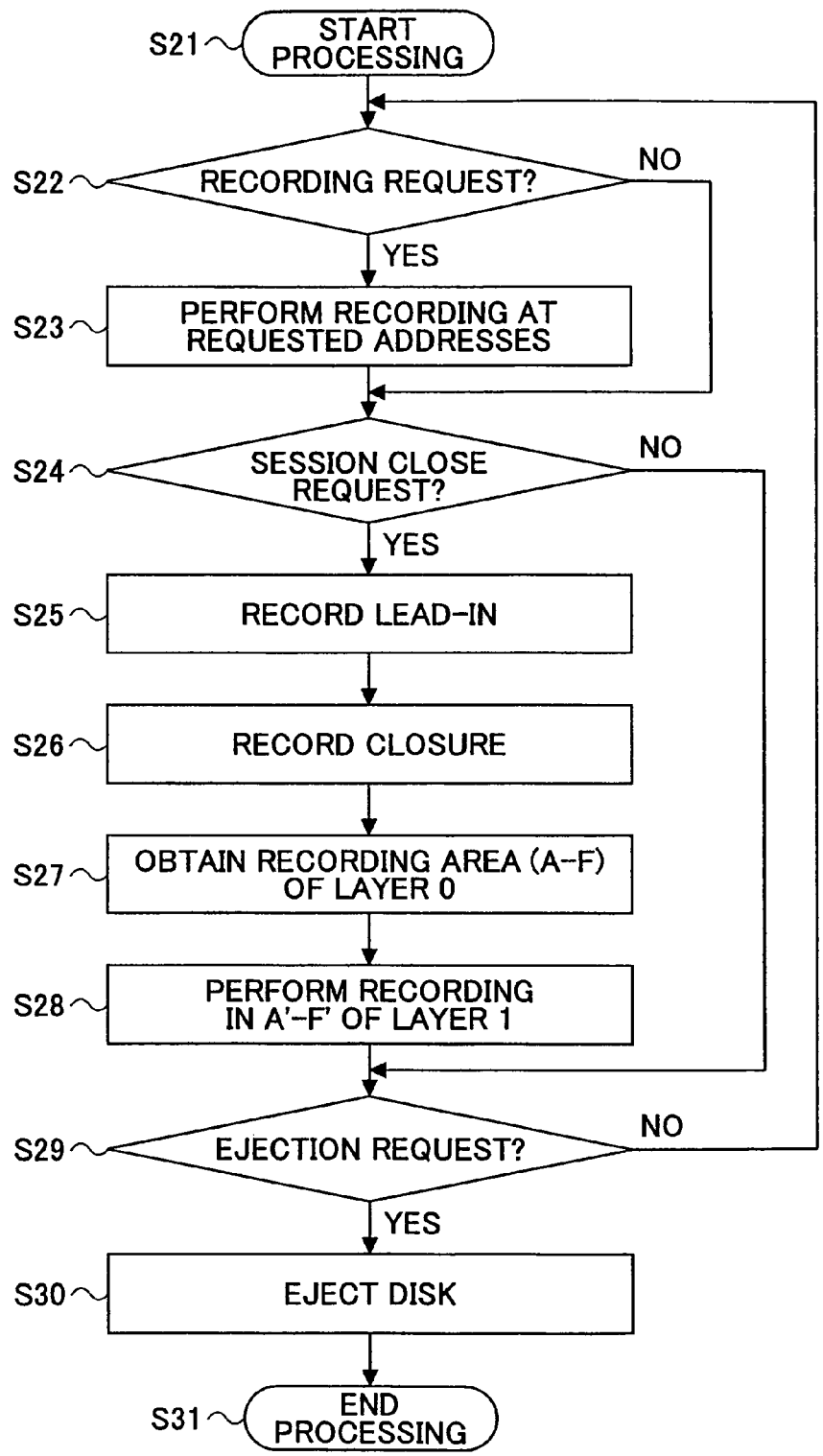
FIG. 8 is a schematic flowchart exemplarily showing another embodiment of the timing control of the information recording method for the dual-layer DVD+RW according to OTP.

Of the information recording method for the dual-layer DVD+RW (optical disk 2), a description is given, with reference to FIG. 8, of another embodiment of control of timing for recording predetermined data. According to this embodiment, multisession recording for the DVD+R, which is a write-once DVD, is applied to recording on the rewritable dual-layer DVD+RW, and it is assumed that Lead-in (Lead-in of the second or later session is referred to as "Intro" according to DVD+R multisession recording) is recorded before a user data area, and Lead-out (similarly, Lead-out of a session before the final session is referred to as "Closure") is recorded after the user data area. Further, the Logical Erase pattern shown in FIGS. 5A and 5B is recorded as predetermined data. Further, as in the case of FIG. 6, in order to simplify processing, recording from a user is performed successively from the starting address of the data area of Layer 0 and data is recorded only in Layer 0 at the time of session closing.

First, when processing is started (step S21), it is determined whether a recording request has been received from a user (S22). If a recording request has been received from a user (Y of S22), recording is performed in a requested area (S23). If no recording request has been received from a user (N of S22), the processing of step S23 is skipped. Next, it is determined whether a Session Close request has been received from the user (S24). If there is no Session Close request (N of S24), it is determined whether a disk ejection request has been received from the user (S29). If there is no disk ejection request (N of S29), a recording request from the user is awaited again (S22). Data recording is performed by repeating the above-described processing. Here, it is assumed that a Session Close request is received from the user when data recording has been performed up to a position as shown in FIG. 5A (Y of S24). In this case, as shown in FIG. 5B, first, the Lead-in area is recorded (Layer 0) (S25), and thereafter, Closure is recorded (Layer 0) (S26). Next, the recorded area in Layer 0 is obtained (S27). In the case of FIGS. 5A and 5B, recording has been performed from Address A to Address F. The processing of step S27 is executed as a recorded area presence or absence determination step, recorded area presence or absence determination means, or a recorded area presence or absence determination function. Next, a Logical Erase pattern is recorded in the area (from Address F' to Address A') in Layer 1 which is at the same radial position as the recorded area in Layer 0 (S28). The processing of step S28 is executed as a corresponding unrecorded area data filling step, corresponding unrecorded area data filling means, or a corresponding unrecorded area data filling function. The above is session closing. Next, it is determined whether a disk ejection request has been received from the user (S29). If a disk ejection request has been received from the user (Y of S29), the disk is ejected (S30), and the processing ends (S31). If there is no disk ejection request (N of S29), a recording request from the user is awaited again (S22). Here, if a recording request is received from the user, recording is to be performed in a new session. On the other hand, if no Session Close request is received from the user in step S24 and a disk ejection request is received in step S29, this means that the user does not need playback compatibility in read-only DVD drives. Accordingly, the processing of steps S25 through S28 is skipped, and the disk is ejected, being in the state of FIG. 5A.

Figure 9A:
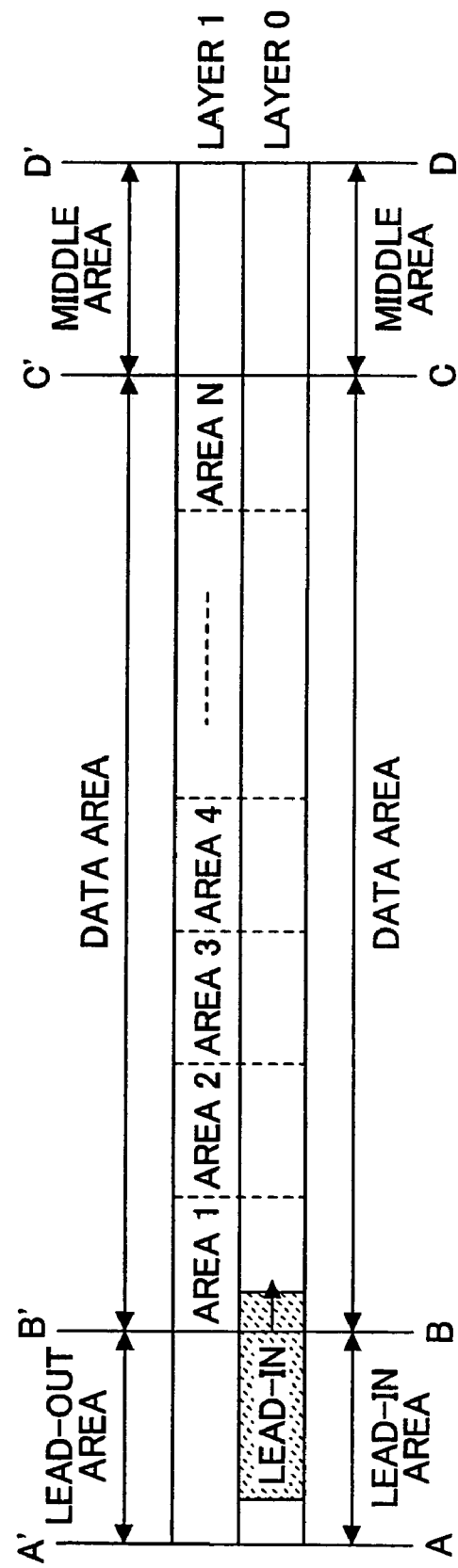
FIGS. 9A through 9F are explanatory diagrams exemplarily showing an embodiment of background formatting of the dual-layer DVD+RW according to OTP.

Of the information recording method for the dual-layer DVD+RW (optical disk 2), a description is given, with reference to FIGS. 9A through 9F and 10, of an embodiment with background formatting. An overview of this embodiment is as follows. The dual-layer DVD+RW (optical disk 2) is formatted by background formatting, and if a recording request is received from a user during the formatting, the formatting is interrupted, and data recording is performed. Further, recording of predetermined data in Layer 1 is performed as dummy data recording by background formatting when no disk access request is received from a user. When a recording request is received from a user during predetermined data recording, the predetermined data recording is interrupted, and recording requested by the user is performed. Further, dummy data recording by background formatting performs N division of a data area as shown in FIG. 9A, and performs recording alternately in Layer 0 and Layer 1 in each divided area. If a formatting interruption request is received from a user, predetermined data recording in Layer 1 is completed, and temporary middle areas and Lead-out are recorded. In order to simplify description, recording from a user is performed at addresses in Layer 0.

FIG. 9A shows a state where formatting of the dual-layer DVD+RW (optical disk 2) has started. The broken lines in the drawing indicate recording units in which dummy data recording is successively performed in each recording layer. In background formatting, it is possible to perform recording from a user merely by performing recording in part of the Lead-in area (initial processing).

Figure 9B:
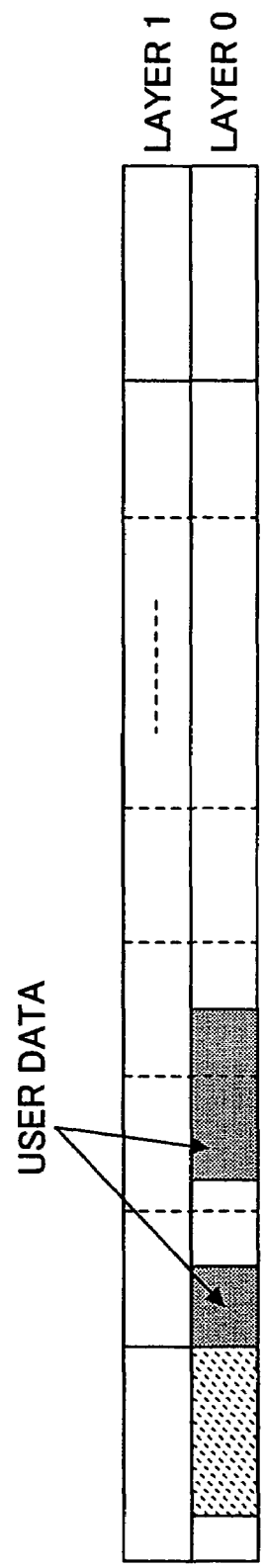

FIG. 9B shows a state where data requested by a user has been recorded. When a recording request is received from a user during background formatting, formatting (dummy data recording) is interrupted, and requested data is recorded.

Figure 9C:
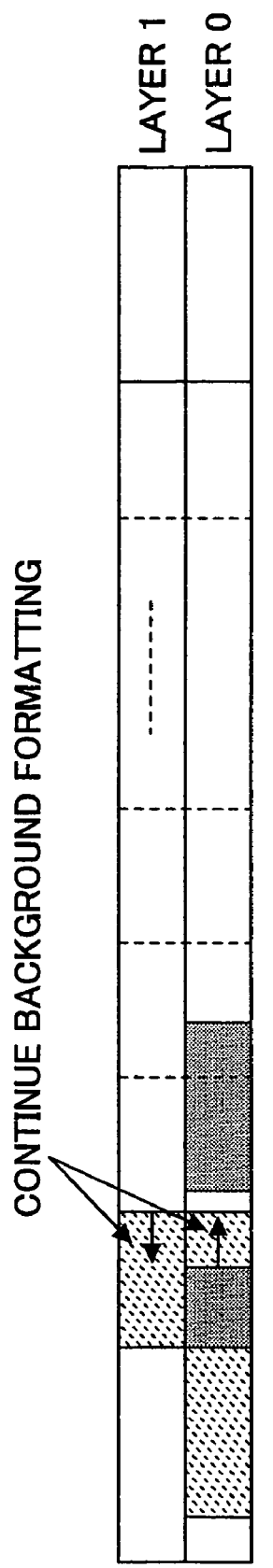

FIG. 9C shows a state where background formatting has been restarted after completion of user data recording. Dummy data recording in background formatting performs recording alternately in Layer 0 and Layer 1 in each predetermined divided area. Here, predetermined data recording is performed when no access request is received from a user, and the function of dummy data recording in formatting is substituted.

Figure 9D:
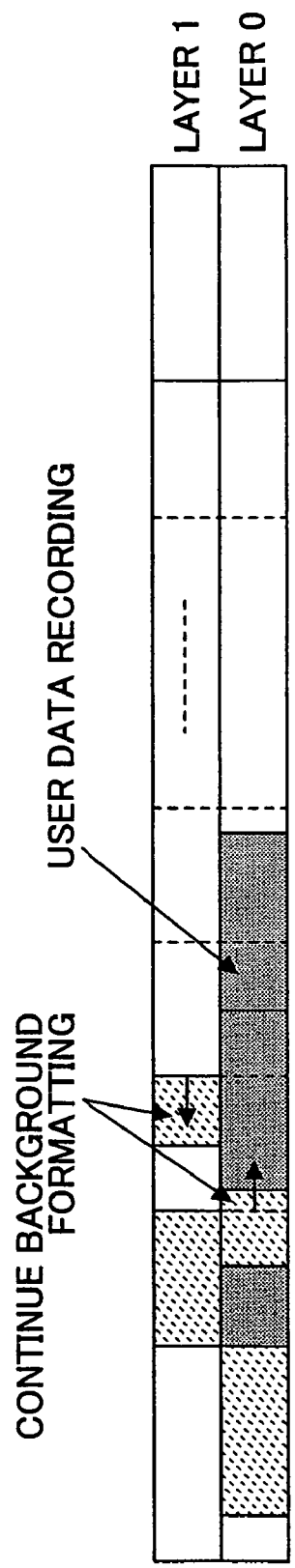

FIG. 9D shows a state where a recording request has been received from a user during predetermined data recording (dummy data recording in formatting) in Layer 1. When dummy data recording in a predetermined recording unit in formatting is completed in FIG. 9C, recording is performed in Layer 0 and Layer 1 in this order in an area that is the next unit. Here, when a recording request is received from a user while recording dummy data in Layer 1, dummy data recording is interrupted, and requested data recording is performed.

Figure 9E:
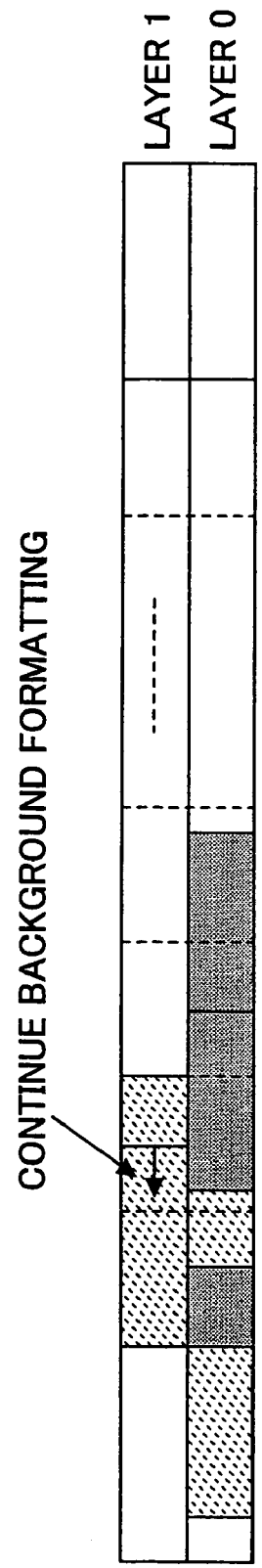

FIG. 9E shows a state where predetermined data recording (dummy data recording in formatting) has been restarted after completion of user data recording.

Figure 9F:
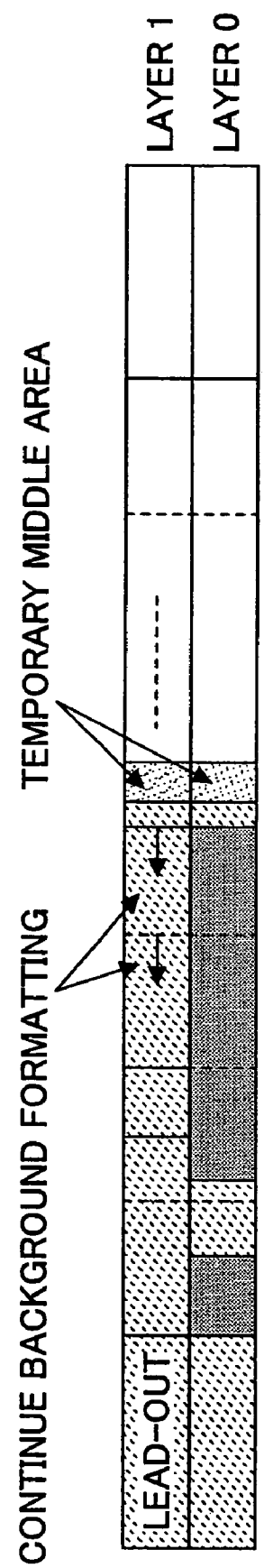

FIG. 9F shows a state where a formatting interruption request has been received from a user. In formatting interruption, first, a final recording area in Layer 0 is detected, and dummy data is recorded in an unrecorded area existing inside this area. Here, dummy data is recorded in the area of Layer. 1. When dummy data recording in the data area is completed, temporary middle areas are recorded subsequent to (on the periphery side of) the final recording area, and further, Lead-out is recorded in the Lead-out area.

In this embodiment, the processing of dummy data recording in background formatting is substituted for predetermined data recording. It is also possible to perform predetermined data recording in the background in recording apparatuses that do not perform background formatting.

Figure 10:
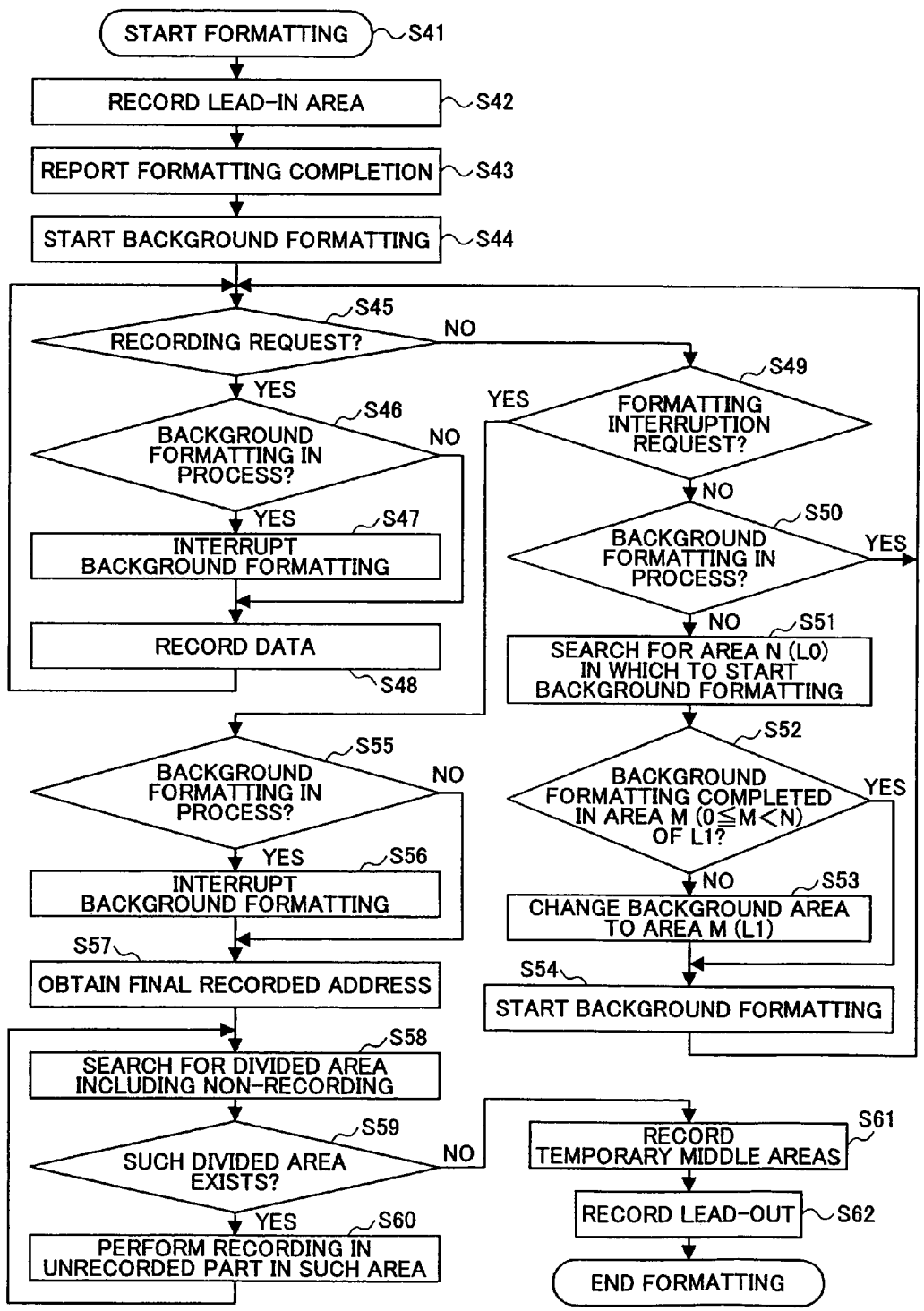
FIG. 10 is a schematic flowchart exemplarily showing an embodiment of its processing control.

Here, a description is given, with reference to FIG. 10, of processing control with respect to this recording operation. Here, predetermined data recording in Layer 1 is performed as dummy data recording in background formatting when no disk access request is received from a user. Further, in order to simplify the description, recording from a user is performed at addresses in Layer 0.

First, when a formatting request is received from a user (S41), part of the Lead-in area is recorded (S42), the user is notified of completion of formatting (S43), and background formatting is started (S44). Dummy data recording in a data area in background formatting is referred to as "De-ice." After starting background formatting, data recording can be performed at random from the user. Next, it is determined whether a recording request has been received from the user (S45). If a recording request has been received from the user (Y of S45), it is determined whether background formatting is in process (S46). If formatting is in process (Y of S46), background formatting is interrupted (S47), and requested data recording is performed (S48). The processing of steps S41 through S48 is executed as a background formatting step, background formatting means, or a background formatting function.

If background formatting is not in process (N of S46), the processing of step S47 is skipped. On the other hand, if no recording request is received from the user (N of S45), it is determined whether a formatting interruption request has been received from the user (S49). If there is no formatting interruption request (N of S49), it is determined whether background formatting is in process (S50). Here, if background formatting is in process (Y of S50), a recording request from the user is awaited again (S45). On the other hand, if background formatting is not in process (N of S50), background formatting start processing is entered.

Here, first, from the starting address of background formatting, a divided area N including the address is retrieved (S51). Next, it is determined whether there is an unrecorded area in the divided areas 1 through N−1 in Layer 1 (S52). Here, if there is an unrecorded area in a divided area M (M is a divided area of Layer 1, 0<M<N−1) (Y of S52), the starting address of background formatting is changed to the unrecorded address of the divided area M (S53), and background formatting is started (S54).

On the other hand, if there is no unrecorded area in the divided areas 1 through N−1 in Layer 1 (N of S52), step S53 is skipped, and background formatting is started from the unrecorded area of the divided area N (Layer 0) (S54).

Incidentally, if a formatting interruption request is received from the user (Y of S49), formatting interruption is entered. Here, first, it is determined whether background formatting is in process (S55). If formatting is in process (Y of S55), background formatting is interrupted (S56). If formatting is not in process (N of S55), step S56 is skipped. The processing of steps S55 and S56 is executed as a recording operation interruption step, recording operation interruption means, or a recording operation interruption function.

Next, a final recorded address is obtained (S57), and the divided areas up to this address are searched for a divided area including an unrecorded area (S58). The processing of step S58 is executed as a recorded area presence or absence determination step, recorded area presence or absence determination means, or a recorded area presence or absence determination function. It is determined whether such a divided area exists as a result of this (S59). If such a divided area exists (Y of S59), dummy data is recorded in an unrecorded area in the divided area (S60). The processing of step S60 is executed as a corresponding unrecorded area data filling step, corresponding unrecorded area data filling means, or a corresponding unrecorded area data filling function. If recording in the area is completed, the other areas are again searched for a divided area including an unrecorded area (S58). Thus, by repeating the processing of steps S58 through S60, all the divided areas up to the final recorded address are subjected to recording. As a result, if there is no divided area including an unrecorded area (N of S59), temporary middle areas are recorded from the final recorded address (S61), Lead-out is recorded in the Lead-out area (S62), and formatting ends (S63).

According to this embodiment, the processing of dummy data recording in background formatting is substituted. However, it is also possible to perform predetermined data recording in the background in recording apparatuses that do not perform background formatting.

That is, in the DVD+RW, which is a rewritable DVD, background formatting, which performs formatting to be performed prior to data recording from a user in the background, is employed. In background formatting, in response to a formatting request from a user, the user is notified of completion of formatting after recording is performed in only part of the Lead-in area (initial processing), and dummy data is recorded in the remaining area when there is no access from the user. Accordingly, predetermined data recording may be performed in the background when there is no medium access from the user as in this embodiment. Thus, performing predetermined data recording in the background when there is no medium access from a user makes it possible to reduce time necessary for medium ejection and session closing. Further, since predetermined data recording is not performed during recording from a user, it is possible to prevent recording performance from being lowered. Further, if a medium access request is received from a user during this recording of predetermined data in an unrecorded area, the recording operation of the predetermined data is interrupted. This makes it possible to perform recording of predetermined data in an unrecorded area without causing a problem for the primary accessing operation.

Further, for instance, in the DVD+RW background formatting, it is possible to extract a medium even during formatting. With respect to the DVD+RW, background formatting is interrupted temporarily at the time of extracting the medium. In this interruption, in the case of establishing compatibility with a conventional read-only DVD drive, dummy data is recorded in the unrecorded area between recorded areas intermittently recorded on the medium so as to create a successively recorded state, and thereafter, temporary Lead-out is recorded from the final address of the recording area. In this, it is considered, also with respect to an information recording apparatus performing background formatting on an information recording medium having multiple recording layers, to extract the medium during its formatting. At this point, in order to ensure playback compatibility with read-only drives, it is necessary to perform, in addition to formatting interruption as described with reference to the case of the DVD+RW as an example, recording of predetermined data in an unrecorded area in the other recording layer. Accordingly, according to this embodiment, also in the case of performing background formatting on the optical disk 2 having multiple recording layers, it is possible to extract the disk while ensuring playback compatibility in read-only drives during its formatting.

Incidentally, normally, in background formatting, dummy data is successively recorded from the inside of a medium. Accordingly, in the case of performing background formatting on the optical disk 2 having multiple recording layers, it is expected that dummy data will be recorded from the first recording layer assigned a minimum logical address, and that dummy data will be recorded in the next recording layer when formatting of the first recording layer is completed. However, considering extraction of a medium while ensuring compatibility in read-only drives during formatting, this recording order in background formatting causes a problem in that time is required in interrupting background formatting. This is because no consideration is given to the necessity of recording predetermined data in formatting interruption. For instance, in the case of interrupting formatting with dummy data recording by formatting being completed with respect to substantially the entire data area of the above-described first recording layer, it is necessary to record the predetermined data in substantially the entire data area of the other recording layer in order to ensure compatibility in read-only drives. In this respect, the information recording medium is formatted in the background by dividing each of the data areas of the multiple recording layers into multiple areas and performing recording alternately in the multiple recording layers with respect to these divided areas, and a predetermined timing for performing recording in an unrecorded area is set to be when a background formatting interruption request is received from a user during background formatting of the optical disk 2. As a result, in dummy data recording in background formatting, by performing recording alternately in the data areas of the multiple recording layers divided area by divided area, it is possible, at the time of receiving a format interruption request, to reduce areas in which predetermined data is to be recorded and end formatting interruption in a short period of time.

FIGS. 11A through 11D show the difference in a range requiring predetermined data recording in formatting interruption between the case of performing background formatting in such a manner and the case of performing it successively from Layer 0.

Figure 11A:
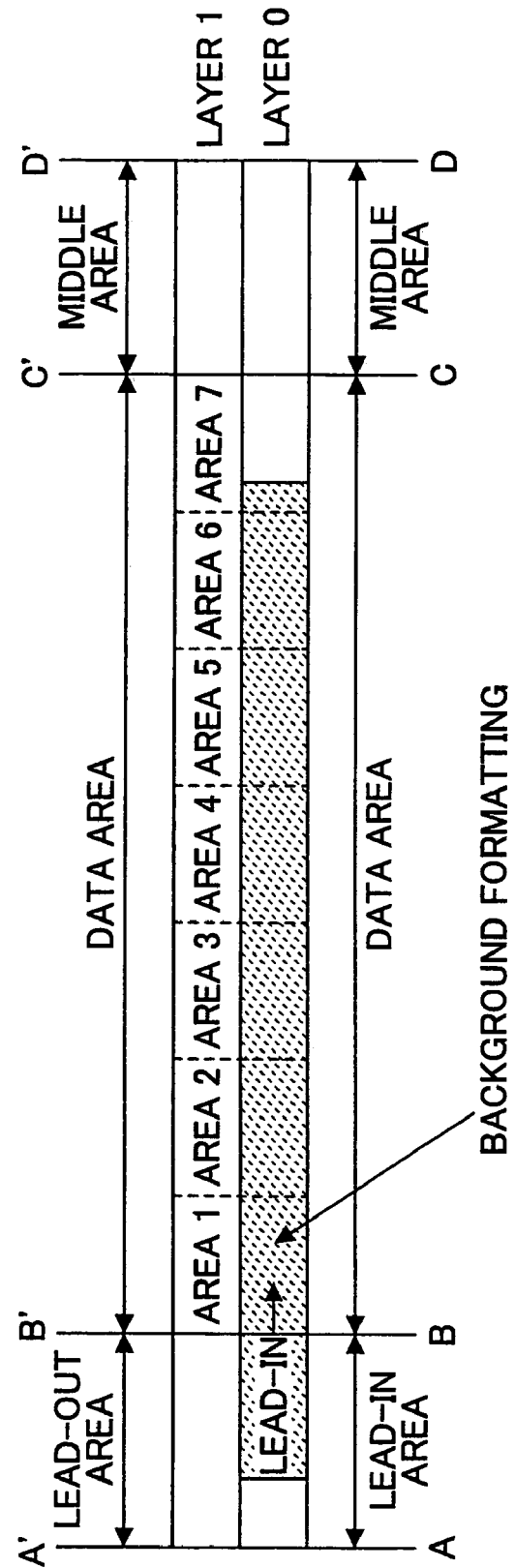
Figure 11B:
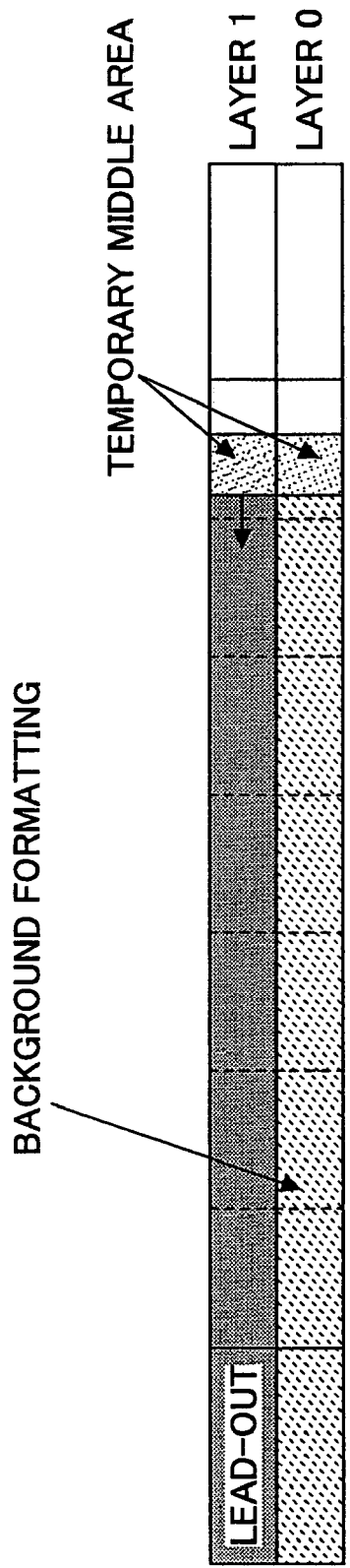

FIG. 11A is the case where background formatting is performed successively from Layer 0. Here, it is assumed that a formatting interruption request is received from a user when recording has been performed in substantially the entire data area of Layer 0. At this point, as shown in FIG. 11B, in order to perform recording in a data area in Layer 1 which is at the same radial position as the recorded area in Layer 0, recording should also be performed in substantially the entire data area of Layer 1, thus requiring a long period of time in formatting interruption.

Figure 11D:
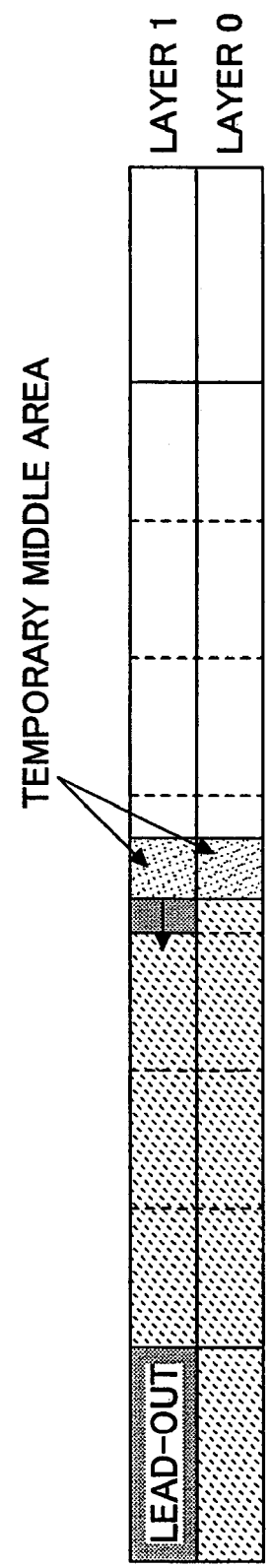

On the other hand, FIG. 11C shows background formatting performed in this embodiment. Here, the data area is divided into seven areas (broken-line areas in the drawing), and recording is performed alternately in the data areas of Layer 0 and Layer 1 in each divided area. Accordingly, recording in Layer 0 proceeds slower than in the case of FIG. 11A. Here, it is assumed that a formatting interruption request is received from a user at a point shown in FIG. 11C. In this case, as shown in FIG. 11D, the area to be subjected to recording in formatting interruption (an unrecorded area in Layer 1 which is at the same radial position as a recorded area in Layer 0) is found to be extremely small compared with the case of FIG. 11B. Accordingly, according to this embodiment, in the case of ejecting a disk during background formatting, it is possible to end formatting interruption in a short period of time.

Each of the above-mentioned embodiments is described as an application to OTP, but is also applicable to PTP in the same manner.

The present invention is not limited to the specifically disclosed embodiments, and variations and modifications may be made without departing from the scope of the present invention.

The present invention is based on Japanese Patent Application No. 2003-328755, filed on Sep. 19, 2003, the entire contents of which are hereby incorporated by reference.

What is claimed is:

1. A method of recording information to a disk recording medium having at least a first layer and a second layer, comprising:

recording dummy data, recording increment by recording increment, on data areas of each of the first and second layers, wherein, within the data areas of the first and second recording layers, the dummy data recording increments are recorded from an inner side toward an outer side of the data areas, and wherein, within each recording increment of the data area of the first layer, the dummy data is recorded from an inner side toward an outer side of the recording increment, and, within each recording increment of the data area of the second layer, the dummy data is recorded from an outer side toward an inner side of the recording increment.

2. The method as claimed in claim 1, further comprising:

receiving a request to eject the disk recording medium from a host during the recording of the dummy data; and recording a data management area prior to ejecting the disk recording medium.

3. An apparatus for recording information to a disk recording medium having at least a first layer and a second layer, the first layer having a data area having an outer side and an inner side and a second layer having a data area having an outer side and an inner side, comprising:

a recording part to record dummy data on the data areas of each of the first and second layers, wherein dummy data is recorded recording increment by recording increment;

wherein, within the data areas of the first and second recording layers, the dummy data recording increments are recorded from the inner side toward the outer side of the data areas, and wherein, within each recording increment of the data area of the first layer, the dummy data is recorded from an inner side toward an outer side of the recording increment, and, within each recording increment of the data area of the second layer, the dummy data is recorded from an outer side toward an inner side of the recording increment.

4. The apparatus as claimed in claim 3, wherein when a request to eject the disk recording medium is received from a host during recording of the dummy data, the disk recording medium is ejected after recording a data management area.

* * * * *